3,458,393
MODIFIED COLLOIDAL CHRYSOTILE AND METHOD OF PREPARING SAME

Orlando A. Battista, Yardley, Pa., assignor to FMC Corporation, Philadelphia, Pa., a corporation of Delaware
No Drawing. Continuation-in-part of application Ser. No. 436,304, Mar. 1, 1965. This application Jan. 31, 1968, Ser. No. 701,838
Int. Cl. D21b *1/16;* C03b *37/00*
U.S. Cl. 162—3                                          7 Claims

ABSTRACT OF THE DISCLOSURE

Chrysotile is subjected to an acidic treatment so as to increase the $SiO_2$ to $MgO$ ratio from 5% to 30% and the chemically modified chrysotile is mechanically attrited until at least 5% by weight has a particle size not exceeding one micron. The microcrystalline colloidal product forms stable, thixotropic dispersions and gels in water and other polar liquids.

---

This application is a continuation-in-part of copending application Ser. No. 436,304, filed Mar. 1, 1965 and now abandoned.

This invention relates to new compositions of matter made by the treatment of fibrous serpentine asbestos, generally called chrysotile, to produce products of slightly altered chemical composition but of the same crystal pattern as chrysotile but in microcrystalline colloidal form; to the novel methods by which these new compositions are made, and to new products which can be made from the novel compositions of this invention.

A variety of fibrous minerals are known which are generally called asbestos. Of these, the fibrous form of serpentine—hydrated magnesium silicate—known as chrysotile, is perhaps the most abundant, as well as the most versatile, principally because of the length and strength of the individual fibers. The product is widely used in preparations where its fibrous nature, combined with its fire resistance, gives it a marked advantage over other materials—for example, in the making of fire-resistant textiles.

In the preparation of useful articles from the crude chrysotile, the problem of separating the mineral into usable fibers has involved considerable effort on the part of asbestos chemists. Mechanical breaking of the ore masses results in the production of shortened fibers, including a considerable percentage of powder, which have been considered of little value.

Chrysotile, as produced by nature, comprises fibers containing bundles of linear fibrils in an inorganic rock-like matrix. The individual fibrils may have diameters as small as a few hundred angstrom units, while their lengths may be hundreds of microns or much longer. The fibers are recovered generally from the serpentine rock deposits by a variety of mechanical crushing and screening techniques, which are designed to preserve the natural length of the fibers as much as possible. Substantially all of the effort has been in the direction of preserving maximum fiber length in order to get the maximum advantage from a physical entanglement of the long fibers or fibrils in making paper-like sheets or asbestos yarns or fabrics.

The major efforts in improving dispersions of long-fibered asbestos have involved the use of surfactants to permit easier separation of the fibers into individual fibrils of maximum length, usually of the order of tens of microns—see, for example, the Novak Patent 2,626,-213, issued Jan. 20, 1953. This approach leads to fibers and fibrils containing an organophilic surface coating which, of course, may be quite undesirable, especially where the inherent high temperature properties of asbestos are to be utilized to maximum advantage.

I have discovered that very valuable products can be made from chrysotile by going in the opposite direction, i.e., by treating chrysotile to reduce its constituent fibers and fibrils to a microcrystalline colloidal form possessing a buildup of particles whose maximum dimension is of the order of under one micron. The resultant products have utilities which in certain respects resemble those of the previous long-fibered asbestos materials and in others resemble those which are obtainable with the far more expensive colloidal forms of silica and alumina.

I have discovered that chrysotile can be treated by an appropriate combination of chemical action and mechanical attrition to produce a new product characterized by sub-micron particle size and colloidal properties, as demonstrated by the ability to form smooth gels in very low concentrations in water and other highly polar liquids. These smooth gels can be spread out such as by means of a doctor blade and will dry to adherent, cohesive, self-supporting film-like masses without the addition of further binder. The films resemble paper.

My new particles are useful for the preparation of such films or sheets and for thickening polar compositions for many industrial uses. The untreated asbestos, on the other hand, when given the identical mechanical disintegration treatment and spread out, gives a non-self-supporting discontinuous film or coating which has little or no obvious utility.

In accordance with the present invention, chrysolite is treated with an acidic medium so as to increase the weight ratio of $SiO_2$ to $MgO$ by from about 5% to about 30% preferably 10% to 25%, as compared to that of the parent chrysotile without substantially altering the actual crystal structure of the chrysotile. Accordingly, a chrysotile having a weight ratio of $SiO_2$ to $MgO$ of 1:1 after treatment with the acidic medium will have a weight ratio of $SiO_2$ to $MgO$ of between about 1.05:1 and about 1.30:1.

Electron microscopy reveals that the treatment weakens the fibrils by etching their surfaces so that they can readily be reduced to submicron size by mechanical disintegration, something which is extremely difficult to do with the untreated extremely resilient fibrils. Furthermore, the treatment also serves to disperse at least some of the fibers into much thinner fibril aggregates. After the treatment, I subject the material to attrition to produce herein at least about 5% by weight of particles whose maximum dimension is under one micron. The resultant product, when mixed with water, glycerol, glycols, or similar highly polar liquids, will produce smooth, highly thixotropic gels at concentrations of the order of 1–3%. The particle size distribution of the remaining 95% of the treated chrysotile will affect the rheology of the gels. For example, if the major portion of the remainder has a particle size not greater than 10 microns, the gel will be smoother than a gel formed using a product in which the major portion of the remainder has a particle size not greater than 30 microns.

The foregoing stated $SiO_2$ to $MgO$ weight ratio is approximate and is based upon the generally accepted formula for chrysotile; $3MgO \cdot 2SiO_2 \cdot 2H_2O$. Chrysotiles from the various world supplies exhibit ratios varying from about 0.92:1 to about 1.055 to 1 depending upon the specific source and natural extraneous impurities. Literature indicates that the $SiO_2$ may constitute from 37% to 44% and the $MgO$ may constitute from 39% to 44%, by weight, of the chrysotile. The present invention is applicable to chrysotile in general.

In the original treatment, the materials which produce the desirable change in chemical composition consist of essentially any acid or acid salt. This acid may be weak or strong and the treatment may be at any desired temperature. However, best results are obtained by treatment at elevated temperatures, preferably the reflux temperature of the particular treating agent involved, in aqueous suspension at rather low solid content. For example, 0.2 N hydrochloric acid can be used to treat chrysotile at about 5–10% solids for one-half to four hours at reflux. This treatment will produce an optimum increase in the $SiO_2$ to MgO ratio of about 20% for rheology control in polar media. The use of a pressure digester to permit digestion under pressure permits a reduction in the time of treatment, as well as in the concentration of acid required to effect a change to the optimum $SiO_2$ to MgO ratio.

After treatment, the modified chrysotile is drained and washed with water, and is then mechanically disintegrated in water or other polar liquid, preferably by a shearing action, as in a Waring Blendor or Osterizer. Other equipment suitable for the mechanical disintegration of the acid pretreated asbestos substance is the Cowles Hi-Shear Mixer, such as Model 1–VG (Cowles Dissolver Co., Inc., Los Angeles, Calif.), or the Rietz Extructor, also capable of effecting high shear during the mechanical disintegration (Rietz Manufacturing Co., Santa Rosa, Calif.). Mechanical disintegration or attrition is carried out so as to produce microcrystalline colloidal segments of the modified asbestos fibrils that are submicron in subdivision and until they comprise at least about 5% of the mechanically disintegrated product, and preferably comprise from about 15 to 20%, or more. The resultant product will form stable dispersions and gels with water and other polar liquids in concentrations of the order of a few percent.

In the initial treatment, I have obtained satisfactory results with hydrochloric acid, sulfuric acid, nitric acid, an acetylating mixture consisting of acetic acid, acetic anhydride, and trace amounts of sulfuric acid (as used in preparing cellulose acetate), and phosphoric acid. Salts which hydrolyze to produce hydrogen ions are also satisfactory and include such salts as the alkali metal acid phosphates and sulfates, for example, $NaH_2PO_4$, $NaHSO_4$ etc. It is important that the acid be not too concentrated. For example, 0.4 normal sulfuric acid at reflux will remove far too much magnesium oxide in five minutes, causing an excessive change in the $SiO_2$ to MgO ratio, together with a rapid loss of yield and in gelling properties. On the other hand, an acetylating mixture of 600 ml. acetic acid plus 110 ml. acetic anhydride plus 3 ml. of concentrated sulfuric acid can be used safely, providing good control to prevent the reaction from going beyond the desired yield and the desired $SiO_2$ to MgO ratio, even after an hour.

Consequently, I prefer to work with dilute acid and have found that 0.2 normal strength hydrochloric acid at atmospheric pressure is about optimum from the point of view of getting the reaction completed in a short time without the danger of too great a loss of product, and without severely detracting from the capability of producing stable aqueous dispersions of it when the digestion involves 5% by weight of chrysotile.

EXAMPLE I

Five pounds by weight of chrysotile (Cassiar mine) $SiO_2$ to MgO, 0.99:1 was mixed with 95 pounds by weight of 0.2 normal hydrochloric acid. The product was divided into four equal portions which were heated at the boil under reflux. A portion of the product was removed at the end of five minutes, fifteen minutes, sixty minutes, and four hours to provide Samples A, B, C and D, respectively. Each of the portions was attrited in a Waring Blendor in water at a solids content of 0.5% until about 20% by weight of the material was submicron in size.

The amount of submicron material was determined by sedimentation, after dilution of an aqueous gel to sufficiently low concentration so that the liquid was sufficiently thin to allow heavy particles to separate out. Specifically, I prepared a 1% gel in water and diluted it by a factor of ten, and adjusted it to pH 3.0 with HCl. A small amount of a dispersing agent may be used to assist in separating the submicron particles more efficiently and rapidly. This was allowed to stand six hours, and the percentage of solids in the top fifth of the material measured. This material, being in Brownian motion, is colloidal; moreover, inspection under the microscope indicated it to be substantially of submicron size. The percentage of submicron material in the total sample was calculated from the amount found in the top fifth.

It is not essential that this procedure be followed precisely in measuring the content of submicron material. So long as microscopic examination of the top aliquot reveals the absence of substantially all material above one micron, the method may be used.

Utilizing like conditions, a sample E was prepared by the use of 0.4 Normal HCl and heating for five minutes. A sample F was prepared by treatment with boiling 0.2 Normal $H_2SO_4$ for five minutes and a sample G was prepared by the use of 0.4 Normal $H_2SO_4$.

The yield and the $SiO_2$ to MgO weight ratio of each product were determined and are reported in Table I. Portions of the attrited samples were well dispersed at 3% solids in ethylene glycol and the apparent viscosity of the dispersion measured in a Brookfield viscometer at 25° C., using a TB 10 spindle at 10 r.p.m.

TABLE I

| Sample | Yield, Percent | $SiO^2$ to $MgO_2$ | Cps. |
| --- | --- | --- | --- |
| A | 87.5 | 1.19 | 27,300 |
| B | 87.9 | 1.16 | 34,200 |
| C | 88.4 | 1.22 | 36,300 |
| D | 87.2 | 1.24 | 38,000 |
| E | 78.0 | 1.54 | 16,000 |
| F | 88.2 | 1.24 | 31,400 |
| G | 76.6 | 1.48 | 2,400 |

Since chrysotile is slightly alkaline, the amount of acid needed will vary somewhat with the percent of chrysotile being treated. Hence, if 10% of more solids are being treated with acid, somewhat higher concentrations are needed.

In the attrition step, the product, which may be used as is on the acid side, or washed substantially free of acid, is subjected to appropriate attrition at high enough solids to form a stiff paste in water. This can be accomplished on a small scale in a Waring Blendor. In large scale operations, a Cowles dissolver or a Bauer refiner (disc mill), or a Rietz Extructor are typically useful. Or the acid treatment and appropriate attrition may be performed simultaneously.

When untreated chrysotile is disintegrated into fine particles in similar machinery, there is little, if any, formation of submicron particles. The resulting chrysotile will not absorb the liquid firmly, although it will absorb it, and an apparent viscosity can be measured due largely to the entanglement of fibers into a ropey dispersion. After treatment with an acidic medium to the optimum $SiO_2$ to MgO ratio and attrition, however, the microcrystalline colloidal rod-like particles of chrysotile will bind water or other highly polar liquids to form smooth, spreadable, firm gels. It seems clear that the acid treatment not only weakens the structure to make it readily reducible in size to submicron state, but apparently changes the surface character of the particles to make it more hydrophilic and more compatible with the aqueous medium. However, X-ray studies of the new product show no change in the basic crystal structure. Moreover, despite the change in the $SiO_2$ to MgO ratio, there appears to be no change in infrared spectrum.

One change that does occur is that on differential thermal analysis there is a marked shift in the valley which normally occurs in unmodified chrysotile at about between 600–700° C., indicating some changes in the ease with which water is lost in the composition at such high temperatures.

The acid pretreatment in combination with proper attrition, in addition to making it possible to produce microcrystalline colloidal material of the original crystal structure, has still another advantage in that it removes impurities such as iron oxide and other acid-soluble impurities which are present to a few percent in almost all chrysotile. This purification which takes place as part of the required acid pretreatment, has the advantage of improving the electrical properties of the material, as well as its whiteness in film and/or sheet form.

As stated hereinabove, the present invention is applicable to chrysotile in general. This may be illustrated by reference to Table II which sets forth various properties of chrysotiles from three world sources and the properties of these chrysotiles after being subjected to the method of the present invention. The modified chrysotile samples were prepared by treating the parent chrysotiles at 10% solids with 0.4 N CHl solutions in a high shear mixer, specifically a Cowles dissolver, for 30 minutes. The slurry was filtered and the filter cake washed with the water to remove soluble salts. The washed filter cake was dried in a forced air oven at 100° C. Both the parent chrysotile samples and the modified chrysotile samples were fluffed by beating dried samples for one minute in a Waring Blendor at low speed before subjecting the samples to the various test procedures.

Each of the parent chrysotiles and the treated chrysotiles was analyzed for $SiO_2$ and $MgO$ content and the ratios calculated from these determinations. Similarly, the refractive indices were determined both for the longitudinal and transverse axes of the samples. The surface area of each of the samples was determined by the conventional nitrogen adsorption method using the Perkin-Elmer Adsorptometer.

Dispersions of each of the samples in tricresyl phosphate were prepared and the viscosity of the dispersions was measured. In each instance, a six gram sample, based upon the dry weight, was dispersed in 800 ml. of distilled water in a Waring Blendor and agitated at low speed for ten seconds. The slurry was then filtered in a Buckner filter and vacuum disconnected when dripping subsided. Five hundred ml. of technical anhydrous isopropanol was then added to the filter and after 60 seconds the vacuum line again applied until dripping subsided. The filter cake was then removed and dried in a forced air oven at 100° C. for ten minutes. 2.00±0.02 gram of each sample were dispersed in a Waring Blendor in 342 ml. of tricresyl phosphate using high speed for two minutes. Each dispersion was then immediately transferred to a jar, the temperature of the dispersion recorded and the viscosity measured in a Brookfield viscometer using a RVT Model Spindle No. 3 at 2.5 r.p.m. In Table II, the viscosity is reported in poises.

The products of this invention exhibit another property not possessed by untreated chrysotile. This property is the stability of the dispersed product in a solution of a general purpose unsaturated polyester, specifically, Laminac 4123, a styrene modified phathalic anhydride-propylene glycol resin. For each of the samples in Table II, a styrene solution of the unsaturated polyester containing approximately 52% solids was prepared. In each instance, a dispersion of 0.25% by weight of the sample was dispersed in the styrene solution by beating in a Waring Blendor at high speed for three minutes. The dispersions formed were transferred to test tubes having one inch diameters and eight inches long, the amount of dispersion being sufficient to fill each tube to the three-quarter mark. The tubes were stoppered and stored in the dark for 24 hours at which time they were examined. For each of the samples prepared in accordance with the present invention, no settling of the dispersed particles was observed. In each of the dispersions formed from the chrysotile samples which had not received the acid treatment prior to disintegration, settling of the particles was sufficient to exhibit a clear layer at the upper portion of the column of liquid. With longer periods of standing, this clear layer gradually increased in depth.

Treatment of chrysotile in accordance with the present invention increases appreciably the oil absorption properties of the chrysotile. Test for the oil absorption was made in accordance with ASTM Method D–281–31 (1966) with the exception that dioctyl phosphate was utilized in place of raw linseed oil and 10 gram samples were used in place of the one gram sample of the ASTM method. In the table, the oil absorption is reported in grams of dioctyl phthalate to exactly "wet" 100 grams of the sample.

X-ray diffraction techniques were used in obtain X-ray defractometer patterns for each of the samples. To illustrate differences in crystalographic characteristics, the areas of two peaks at interplanar spacing, $d$ values at 3.65 A. and 7.29 A., were measured. The ratio between these peaks as reported in Table II were calculated from the measured areas.

From the following table, it is apparent that in each of the chrysotiles there was an increase in the surface area of the acid treated and disintegrated material. The most notable changes in characteristics are reflected in the substantial increase in viscosity when the different materials are dispersed in a liquid such as tricresyl phosphate and in the substantial increase in the oil absorption characteristics. In each instance, the increase is at least about 300%. Probably the most outstanding characteristic is the non-settling properties in polyester solutions in the case of the chrysotiles treated in accordance with the present invention.

TABLE II

| | $SiO_2$:MgO ratio | Refractive index, 25° C. | | Surface area, m.²/gm. | Dispersion in tricresyl phosphate | | Settling in polyester solution | Oil absorption, gm. DOP/ 100 gm. | X-ray area, 3.65 A./ area, 7.29 A. |
|---|---|---|---|---|---|---|---|---|---|
| | | Long. | Trans. | | Viscosity, poises | Type | | | |
| Quebec chrysotile | 0.99 | 1.556 | 1.548 | 20 | 46 (45° C.) | Ropey | Yes | 14 | 0.61 |
| Acid treated and attrited | 1.17 | 1.540 | 1.532 | 70 | 180 (47° C.) | Smooth | No | 44 | 0.82 |
| Coalinga chrysotile | 0.99 | 1.548 | 1.544 | 60 | 16 (46° C.) | Ropey | Yes | 12 | 0.68 |
| Acid treated and attrited | 1.14 | 1.540 | 1.532 | 71 | 132 (46° C.) | Smooth | No | 50 | 0.74 |
| Shabani chrysotile | 1.00 | 1.548 | 1.544 | 11 | 153 (51° C.) | Ropey | Yes | 10 | 0.58 |
| Acid treated and attrited | 1.12 | 1.552 | 1.544 | 59 | 446 (40° C.) | Smooth | No | 40 | 0.70 |

In the commercial production of products in accordance with the present invention, the chrysotile may be treated with the acid solution in a high speed mixer, such as a Cowless dissolver, at a solids concentration of about 10% for a 20 to 30 minute period. Prolonged further mechanical disintegration after completion of the reaction may be carried out, if desired. The slurry may be subsequenlty diluted to a 1% to 3% solids concentration and passed through a hydrocycloning unit to remove rock and then pumped to a drum filter. The filter cake may be washed with water to reduce the chlorine content of the cake to about 0.1% or less. The wet cake is removed from the drum filter, pressed to remove excess water and then transferred to a traveling belt and passed through a drier to reduce the moisture content to about 2% or less. The dried mass may be broken into small fragments or granules for storage and shipment.

Alternatively, after hydrocycloning, the slurry may be pumped to a suitable filter and the filter cake transferred to a tank where sufficient water is added to form a slurry containing about 0.1% solids. The slurry is then fed to a paper-making machine such as a Fourdrinier or Rotoformer. This high dilution with water inherently reduces the chlorine content. The filter cake in sheet form as produced in the paper-making type apparatus may be pressed and transferred to a suitable belt which carries it through drying apparatus. The collected web is subsequently comminuted into small thin chips.

In either case, the crushed filter cake or the web chips are readily dispersible in water or other liquids by the use of high speed mixing devices.

As indicated above, the product has utility in the formation of gels at low solids content, both with water and with hydrophilic polar liquids, such as ethylene and propylene glycols, glycerine, etc. The product also has been found to convert silicone oil (such as Dow Corning 710) and tricresyl phosphate into extremely smooth, stable, high viscosity greases, even at concentrations as low as 0.5–3%.

The gels show a marked change in apparent viscosity with shear rate. When the apparent viscosity is plotted against shear rate on double logarithmic paper, there is a straight-line relationship between the apparent viscosity and the shear rate in r.p.m. For example, a 3% dispersion in ethylene glycol of the product obtained according to Example I, using 0.2 normal HCl for fifteen minutes, followed by attrition so that about 20% of the particles are of submicron size, shows a drop in viscosity from something over 300,000 centipoises at 0.5 r.p.m. to about 500 centipoise at 100 r.p.m. using a HBT Brookfield viscometer with TB spindle at 25° C. This sharp reduction in viscosity is a striking example of the intense non-Newtonian behavior of these dispersions, and the useful thixotropic behavior of gels and pastes made from the product. Compositions, which are readily thinnable by mechanical action such as stirring or brushing, can readily be made utilizing the functional properties of this product. Hence, the product is useful to impart body to hydrophilic materials without destroying their workability—for example, in latex-based paints for false body and leveling control, and in polyester formulations to reduce or eliminate "slump." Another use for the material is for bodying of aqueous alkali solutions. As compared with similar compositions with conventional thickening agents, compositions made with my new micro-crystalline colloidal modified chrysotile retain their color, viscosity, and body on storage, because of its inherent alkali stability.

The innate character of my new product is probably best illustrated by the fact that gels made therefrom, when cast or spread in thin films, will dry out to smooth, white, opaque, self-supporting sheets which are sufficiently strong so that they can be handled without breaking. The whiteness is due partly to the fact that the product has been purified with the removal of iron and similar impurities, and partly due to the more uniform reflection of light by the colloidal size particles. Moreover, the sheets have excellent electrical properties, and thence, are desirable in the production of laminated structures when combined with various synthetic resins, and in particular, with high temperature-resistant resins, wherein the high temperature performance of asbestos can be utilized in combination with the resins.

These sheets are sufficiently smooth to serve as writing or printing surfaces, so that with appropriate fire-resistant markings, they can serve for the preparation of fire-resistant records.

Another aspect of my product is that when made into gels in liquids such as glycol, glycerol, or silicone oils, the gels show remarkable stability on being heated. In the case of gels with ethylene glycol, the gels can be heated to over 60° C. with some thinning, but on cooling, they revert to their original viscosities. This is a most unusual and desirable property in products of this sort, and the combined properties of viscosity stability on storage and thermal viscosity stability represent functional advantages of considerable practical value.

It is obvious that my new products are inexpensive, since they are obtained in high yields from an initially inexpensive material by inexpensive processing steps. Moreover, the less costly and less desirable (shorter-fiber) forms of chrysotile, from the point of view of original fiber length, are entirely satisfactory. These forms of chrysotile can be used to produce products comparable with and superior to those obtained with submicron colloidal silica spherical particles and colloidal alumina rod-like particles, which are more expensive to produce.

The products of this invention are useful for the manufacture of fire-resistant sheets, films, fibers, fabrics and the like. The dispersible modified asbestos may be used alone or incorporated in other filament and film-forming substances, such as viscose, cellulose ester and ether solutions, synthetic resin solutions or latexes, polyesters, polyamides, polypropylenes, and the like. Also, the gel may be applied as a size, leveling agent or binder on paper yarns, or fabrics.

Microcrystalline colloidal silicate from asbestos has also been found especially useful for the clarification and densification of sewage sludge when used in dry flour or powder form. Because of its absorptive properties for dyes and phenolic compounds, other industrial waste waters such as dyehouse waste may be effectively treated with this form of modified chrysotile. For these purposes, the product may contain as low as about 5% of the particles having a maximum particle size of one micron.

It is an excellent ingredient for column separation and proved effective when used this way for decolorizing a solution of brown sugar. Microcrystalline colloidal silicates in dry powder form can be used to filter gases such as cigarette smoke because of their unique surface affinity for phenol-based chemicals and other organic compounds. For example, they can be an effective filter material for removal of benzopyrene in cigarette smoke. Similarly, when added to solutions or dispersions of dyes, they are capable of decolorizing dye solutions. Gels of this product were found to be quite effective in producing stable graphite greases, preventing any separation of the graphite particles on standing for long periods of time so that their bodying action can be utilized effectively to stabilize suspensions of particulate matter such as pigments, etc. The compatibility and stability of these gels in strong acids, as well as acid-salt solutions such as $ZnCl_2$, make them especially useful as long-lasting gelling media for leak-proof dry cell batteries.

Obviously, departures can be made from specific examples shown in the above description, without departing from the spirit of the invention which is defined in the claims. More particularly, other acid materials can be used and other means of attrition, and the product can, if desired, be substantially completely reduced to submicron size by attrition, although this is not necessary.

I claim.

1. As an article of manufacture, chemically modified chrysotile at least 5% by weight having a particle size not exceeding about one micron and being characterized in having a $SiO_2$ to $MgO$ weight ratio of from about 5% to about 30% greater than the corresponding ratio of the parent chrysotile.

2. An article of manufacture as defined in claim 1 wherein at least 10% by weight of the modified chrysotile has a particle size not exceeding about one micron and the SiO₂ to MgO weight ratio of the modified chrysotile is from 10% to 25% greater than that of the parent chrysotile.

3. An article of manufacture as defined in claim 1 consisting essentially of the chemically modified chrysotile colloidally dispersed in a hydrophilic liquid.

4. An article of manufacture as defined in claim 1 wherein the chemically modified chrysotile is in the form of a self-supporting fibrous sheet.

5. The method of treating chrysotile which comprises subjecting it to the action of an acidic solution for a time and at a temperature sufficient to increase the $SiO_2$ to MgO weight ratio from about 5% to about 30% and mechanically attriting the treated chrysotile until at least 5% by weight has been reduced to a particle size not exceeding about one micron.

6. The method as defined in claim 5 wherein the chrysotile is treated with a solution of a mineral acid.

7. The method as defined in claim 5 wherein the chrysotile is treated with a dilute solution of hydrochloric acid at the reflux temperature for from about 30 minutes to about four hours.

References Cited

UNITED STATES PATENTS

| | | | |
|---|---|---|---|
| 130,663 | 8/1872 | Rosenthal | 162—3 |
| 1,340,535 | 5/1920 | Garcin | 162—3 |
| 3,031,322 | 4/1962 | Bugosh | 106—287 X |
| 3,075,847 | 1/1963 | Henry | 106—287 X |

FOREIGN PATENTS

| | | |
|---|---|---|
| 13,412 | 5/1928 | Australia. |
| 859,023 | 1/1961 | Great Britain. |

HOWARD R. CAINE, Primary Examiner

U.S. Cl. X.R.

106—287; 162—149, 155; 252—450

PO-1050
(5/69)

UNITED STATES PATENT OFFICE
CERTIFICATE OF CORRECTION

Patent No. 3,458,393            Dated July 29, 1969

Inventor(s)    Orlando A. Battista

It is certified that error appears in the above-identified patent and that said Letters Patent are hereby corrected as shown below:

Column 1, line 47, after "considerable" insert --development--; Column 4, line 34 (Table I), third column, in the heading "$SiO^2$ to $MgO_2$" should read --$SiO_2$ to MgO--; line 51, change "dissolver" to --Dissolver--; change "refiner" to --Refiner--. Column 5, line 22, "CH1" should read --HCl--; line 23, change "dissolver" to --Dissolver--. Column 6, line 33 "in" should read --to--. Column 6, line 72, "Cowless dissolver" should read --Cowles Dissolver--; line 76, correct the spelling of subsequently. Column 7, line 68, change "thence" to read --hence--.

SIGNED AND
SEALED
MAR 31 1970

(SEAL)
Attest:

Edward M. Fletcher, Jr.
Attesting Officer

WILLIAM E. SCHUYLER, JR.
Commissioner of Patents